United States Patent
Pontius

(10) Patent No.: US 6,542,855 B1
(45) Date of Patent: Apr. 1, 2003

(54) SELECTING A CACHE DESIGN FOR A COMPUTER SYSTEM USING A MODEL WITH A SEED CACHE TO GENERATE A TRACE

(75) Inventor: Timothy A. Pontius, Lake in the Hills, IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/309,137

(22) Filed: May 10, 1999

(51) Int. Cl.$^7$ ............................................. G06F 15/00
(52) U.S. Cl. ........................... 702/186; 712/241; 714/6; 717/9
(58) Field of Search ................................. 702/113, 117, 702/118, 186; 712/34, 235, 241; 714/6; 709/102; 707/2; 711/141

(56) References Cited

U.S. PATENT DOCUMENTS

| | | | |
|---|---|---|---|
| 5,471,593 A | * 11/1995 | Branigin | 712/235 |
| 5,651,137 A | * 7/1997 | MacWilliams et al. | 711/141 |
| 5,826,101 A | * 10/1998 | Beck et al. | 712/34 |
| 5,950,009 A | * 9/1999 | Bortnikov et al. | 717/9 |
| 6,012,052 A | * 1/2000 | Altschuler et al. | 707/2 |
| 6,212,629 B1 | * 4/2001 | McFarland et al. | 712/241 |
| 6,272,649 B1 | * 8/2001 | Hayward et al. | 714/6 |
| 6,298,370 B1 | * 10/2001 | Tang et al. | 709/102 |

* cited by examiner

*Primary Examiner*—Marc S. Hoff
*Assistant Examiner*—Mohamed Charioui
(74) *Attorney, Agent, or Firm*—Peter Zawilski

(57) ABSTRACT

A method of selecting a cache design for a computer system begins with the making of a prototype module with a processor, a "seed" cache, and a trace detection module. The prototype module can be inserted within a system that includes main memory and peripherals. While an application program is run on the system, the communications between the processor and the seed cache are detected and compressed. The compressed detections are stored in a trace capture module and collectively define a trace of the program on the prototype module. The trace is then expanded and used to evaluate a candidate cache design. The expansion and evaluation can be iterated to evaluate many cache designs. The method can be used to pick the cache design with the best performance or as a foundation for performing a cost/performance comparison of the evaluated caches. In this method, a single prototype is used to generate an accurate trace that permits many alternative cache designs to be evaluated. This contrasts with methods that use cacheless models to develop less accurate traces and methods that allow only one cache design to be evaluated per prototype. In summary, the invention provides an accurate and efficient method of evaluating alternative cache designs.

7 Claims, 2 Drawing Sheets

SELECTING A CACHE DESIGN FOR A COMPUTER SYSTEM USING A MODEL WITH A SEED CACHE TO GENERATE A TRACE

BACKGROUND OF THE INVENTION

The present invention relates to computers and, more particularly, to a method for selecting a cache design for a computer system. A major objective of the invention is to provide a method for quantitatively estimating the performance of alternative cache designs for incorporation in a given computer system.

Much of modern progress is associated with the proliferation of computers. While much attention is focussed on general-purpose computers, application-specific computers are even more prevalent. (Application-specific computers typically incorporate one or more customed-designed integrated circuits—referred to as "application-specific integrated circuits" or "ASICs") Such application-specific computers can be found in new device categories, such as video games, and in advanced versions of old device categories, such as televisions.

A typical computer includes a processor and main memory. The processor executes program instructions, many of which involve the processing of data. Instructions are read from main memory, and data is read from and written to main memory. Advancing technology has provided faster processors and faster memories. As fast as memories have become, they remain a computational bottleneck; processors often have to idle while requests are filled from main memory.

Caches are often employed to reduce this idle time. Caches intercept requests to main memory and attempt to fulfill those requests using memory dedicated to the cache. To be effective, caches must be able to respond much faster than main memory; to achieve the required speed, caches tend to have far less capacity than does main memory. Due to their smaller capacity, caches can normally hold only a fraction of the data and instructions stored in main memory. An effective cache must employ a strategy that provides that the probability of a request for main-memory locations stored in the cache is much greater than the probability of a request for main-memory locations not stored in the cache.

There are many types of computer systems that use caches. A single pedagogical example is presented at this point to illustrate some of the issues regarding selection of a cache design. The application is a "set-top" box designed to process digital television signals in accordance with inputs received from the signal itself, from panel controls, and from remote controls over a digital infrared link. The set top box includes a 100 MHz 32-bit processor. This processor accesses instructions and data in 32-bit words. These words are arranged in $2^{20}$ addressable 32-bit word locations of main-memory. Program instructions are loaded into main memory from. flash memory automatically when power is turned on. The processor asserts 30-bit word addresses; obviously, only a small fraction of these correspond to physical main memory locations.

A single cache design can involve one or more caches. There are level-1 and level-2 caches. In a Harvard architecture, there can be separate caches for data and for instructions. In addition, there can be a write buffer, which is typically a cache used to speed up write operations, especially, in a write-through mode. Also, the memory management units for many systems can include a translations-look-aside buffer (TLB), which is typically a fully associative cache.

In the pedagogical example, the cache is an integrated data/instruction cache with an associated write buffer. The main cache is a 4-way set associative cache with $2^{10}$ addressable 32-bit word locations. These are arranged in four sets. Each set has $2^6$ line locations, each with a respective 6-bit index. Each line location includes four word locations.

When the processor requests a read from a main-memory address, the cache checks its own memory to determine if there is a copy of that main memory location in the cache. If the address is not represented in the cache, a cache "miss" occurs. In the event of a miss, the cache fetches the requested contents from main memory. However, it is not just the requested word that is fetched, but an entire four-word line (having a line address constituted by the most significant 28 bits of the word address).

This fetched line is stored in a line location of the cache. The line must be stored at a cache line location having an index that matches the six least significant bits of the address of the fetched line. There is exactly one such location in each of the four cache sets; thus, there are four possible storage locations for the fetched line. A location without valid contents is preferred for storing the fetched line over a location with valid data. A location with less recently used contents is preferred to one with more recently used data. In the event of ties, the sets are assigned an implicit order so that the set with the lowest implicit order is selected for storing the fetched line.

The cache includes a write buffer that is used to pipeline write operations to speed up write operations in write-through mode. In write-though mode processor writes are written directly to main memory. The write buffer is one-word (32 bits) wide, and four words deep. Thus, the processor can issue four write requests and then attend to other tasks while the cache fulfills the requests in the background.

The question then arises: "Is this cache design optimal for the incorporating system?" Would a larger cache provide a big enough performance advantage to justify the additional cost (financial, speed, complexity, chip space, etc.)? Would a smaller cache provide almost the same performance at a significantly lower cost? Would the cache be more effective in arranged as a two-way set associative cache, or possibly as an eight-way set-associative cache? Should the line length be increased to eight words or even to sixteen words. Should the write buffer be shallower or deeper? Should the write buffer have a different width? (Probably not in this case; but write buffer width is an issue in systems where the processor asserts requests with different widths.)

In the event of a read miss, there are alternative policies for determining which set is to store a fetched line. Also, there are strategies that involving fetching lines even when there is no miss because a request for an address not represented in the cache is anticipated. In the event of a write hit, should the data written to cache be written immediately back to main memory, or should the write-back wait until the corresponding cache location is about to be overwritten. In the event of a write miss, should the data just be written to main memory and the cache left unchanged, or should the location written to in main memory be fetched so that it is now represented in the cache.

The rewards for cache optimization can be significant. Cache optimization, especially in application-specific computers where one program is run repeatedly, can result in significant performance enhancements. Achieving such performance enhancements by optimizing cache design as opposed to increasing processor speeds can be very cost effective. Increased processor speeds can require higher cost processors, increased power requirements, and increased problems with heat dissipation. In contrast, some cache optimizations, such as those involving rearranging a fixed cache memory size, are virtually cost free (on a post set-up per unit basis).

The challenge is to find a method of optimizing a cache design that is both effective and cost-effective. While a selection can be made as an "educated guess", there is little assurance that the selected design is actually optimal. In competitive applications, some sort of quantitative comparative evaluation of alternative cache designs is called for.

In a multiple-prototype approach, multiple prototype systems with different cache designs are built and their performances are compared under test conditions that are essentially the same as the intended operating conditions. This multiple-prototype approach provides a very accurate comparative evaluation of the tested alternatives. However, since the costs (time and money) of a prototype system tend to be high, it is impractical to test a large number designs this way. If only a few designs are tested, there is a high likelihood that an optimal design will not be tested—and thus not selected.

Instead of building hardware prototypes of the systems with the various caches being considered, a multiple-simulations approach develops software models of the systems with alternative cache designs. The model is typically written in a general-purpose computer language such a C or C++, or a hardware description language such as VHDL or Verilog. Such a model can accurately count clock cycles required for each operation. A software version of an intended ROM-based firmware program can be executed on these software models. The simulations then provide comparative performance data for the different cache design selections. The simulation approach tends to be much less expensive and much less consuming that the multiple-prototype approach. Thus, this multiple-simulations approach allows more alternative cache designs to be considered for a given cost in time and money. Therefore, the set of designs tested is likely to include a more optimal cache design.

On the other hand, the results in the multiple-simulation approach can be less valid that the results of the multiple-prototype approach. One problem is that the program is run in simulation many orders of magnitude slower than it is to be run in hardware in the final system. It can be difficult to simulate certain types of signal events in the slower time frame. For example, television signals can be difficult to simulate. In particular, it might be difficult for the simulation to represent the frequency with which interrupts are generated; the frequency and nature of interrupts can have a substantial effect of comparative performance of cache designs.

The slow time frame not only causes a problem with the validity of cache performance measures, but also causes the simulations to be orders of magnitude more time consuming that the program executions on a prototype. For example, each simulation can consume several days of computer time. While less than is consumed in building a prototype, this time is enough to discourage testing of many alternative cache designs. This limitation makes it difficult to optimize cache design.

A cacheless-model trace-generation approach allows many cache designs to be compared in a manner that is efficient in terms of both cost and time. The trace-generation method involves building a relatively simple model of the system without a cache. The test program is run in simulation on the model. Instead of counting clock cycles, a trace is generated. The trace is a log of communications between the processor and main memory. A computer program, typically written in C, is then used to analyze this trace and determine the performance of various cache designs.

The cacheless-model trace-generation approach does not require the building of a prototype, and the test program is run in simulation only once. Also, the model is simpler and more readily generated than models used in the multiple-simulation approach. Program execution is less consuming than in the multiple-simulations approach since clock cycles do not need to be counted. The cache evaluation program is relatively quick, allowing many alternatives to be evaluated and compared.

The major problem with the trace-generation approach is that the results are the least accurate. The model used to generate the trace shares the problem of the multiple-simulation approach that the time frame of the execution of the test program is unrealistic. The trace approach further suffers since model on which the program is executed is simpler and thus less accurate than the models (which incorporate the caches to be evaluated) used in the multiple-simulation approach.

Considered as a series, the three approaches, the cacheless-model trace-generation approach the multiple-simulation approach, and the multiple-prototype approach provide increasing accuracy of evaluations at increasing costs in terms of time and money. What is needed is an approach that permits a more favorable tradeoff between cost and accuracy. Such a method should allow many different cache designs to be quantitatively evaluated at a reasonable cost, but with greater accuracy than is available using the simple-model trace-generation approach.

SUMMARY OF THE INVENTION

The present invention provides a seed-cache-model trace approach that combines the simple-model trace-generation approach with either one of the multiple-prototype approach or the multiple-simulation approach. In either case, the invention provides that a model of a system including a processor design, a "seed" cache design, and a trace-detection module be constructed. In one realization of the invention, the model is a software model, as it would be in the multiple-simulation approach. In a preferred realization of the invention, the model is a hardware prototype that includes the processor, seed cache, and trace-detection module on a single integrated circuit.

A test program is executed on the model in a manner appropriate to the type of model. However, unlike the multiple-prototype approach and the multiple-simulation approach, the simulation is not used (primarily) to evaluate the seed-cache design. Instead, a trace of communications between the processor and the seed cache is captured. A program, essentially the same as used in the cacheless-model trace-generation approach, is then used to evaluate different cache designs. The seed cache is not considered primarily as a candidate cache (although it can be one of the candidates) but as a means for obtaining a more accurate trace. This allows the evaluations of caches other than the seed cache to be more accurate.

In the preferred realization of the invention, the model is a hardware model rather than a software model. Trace capture involves tapping the signal paths between the processor and the seed cache. Since it can be assumed that the cache processor signal lines are optimized for speed (e.g., they are as short as possible) and are heavily utilized, it is problematic to transmit all the information along these signal lines to a remote trace capture module. To reduce the amount of data to be transmitted to the trace capture module, the trace data is compressed locally.

Significant compression can be achieved using several techniques. One technique takes advantage of the fact that the contents of many signals are predetermined. For example, many of the communications represent main memory addresses. Furthermore, these addresses often appear in consecutive series, so the data can be compressed, for example, by comparing each address with an expected address that is one unit higher than the previous address. Another technique takes advantage of knowledge of the contents of memory locations; for example, the contents of memory locations holding instructions are known ahead of time. Therefore, when a memory location is accessed, the compression scheme can simply affirm that the contents fulfilling the request are as expected.

A major advantage of the invention over the multiple-prototype approach and the multiple-simulation approach is that only one model is required and the application program need only be run once to evaluate many cache designs. A major advantage over the cache-less model trace-generation approach is that the results are based on more valid traces. In the preferred hardware realization of the invention, the trace is obtained at speeds and in an environment that can be as close as desired to the target application. Thus, with one model and one run of an application program, many different cache designs can be evaluated with enhanced accuracy. These and other features and advantages of the invention are apparent from the description below with reference to the following drawings.

DETAILED DESCRIPTION OF THE PREFERRED EMBODIMENTS

Figure 1:
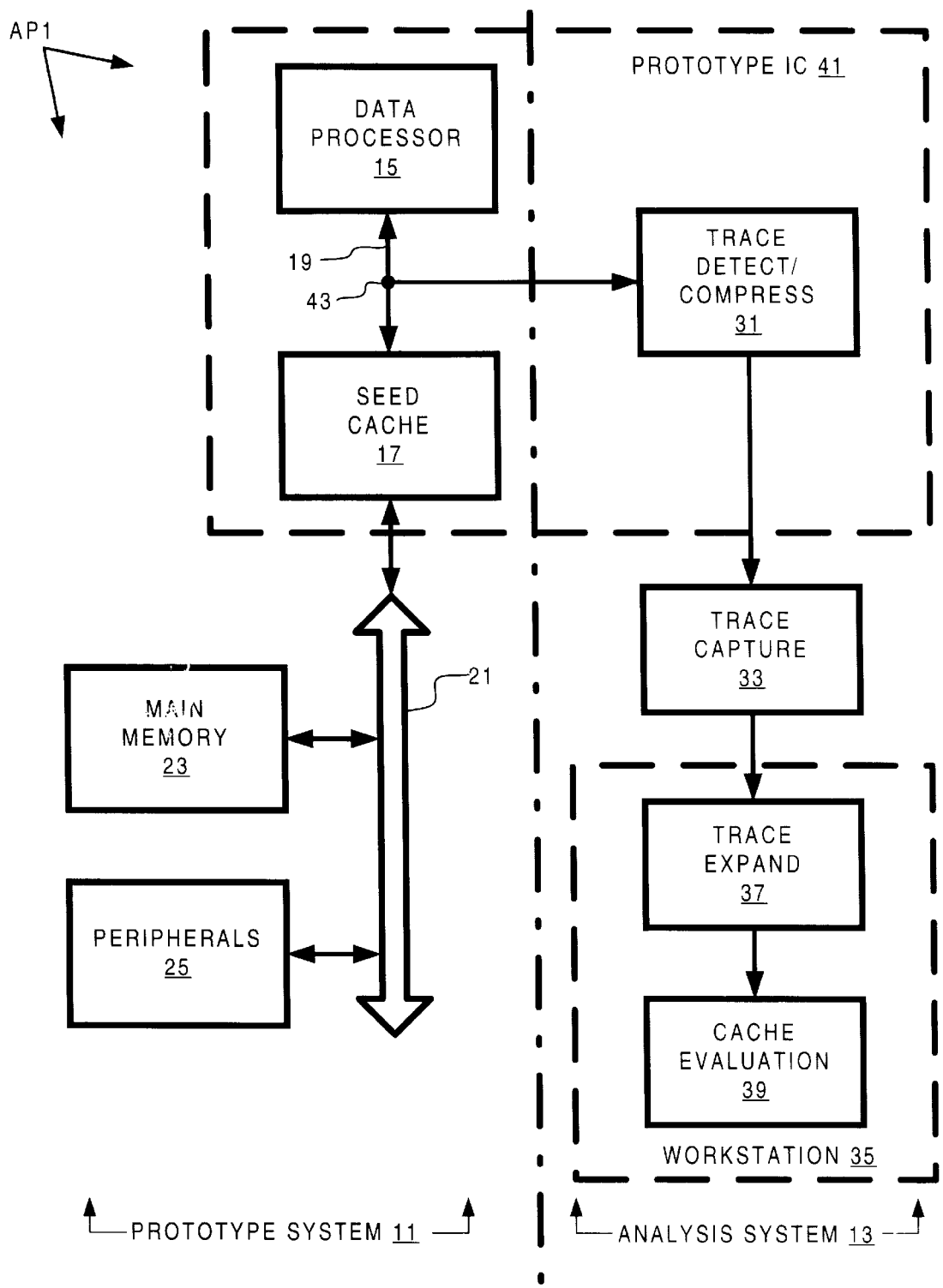
FIG. 1 is a schematic diagram of a cache evaluation system in accordance with the present invention.

In accordance with the present invention, a cache-selection system AP1 comprises a prototype system 11 and an analysis system 13, as shown in FIG. 1. Prototype system 11 comprises a data processor 15, a seed cache 17, a processor-cache bus 19, a system bus 21, main memory 23, and peripherals 25. Analysis system 13 comprises a trace detection module 31, a trace capture module 33, and a workstation 35 that runs a trace expansion program 37 and a cache evaluation program 39.

Processor 15, seed cache 17, processor-cache bus 19, and trace detection module 31 are arranged on a common prototype integrated circuit 41. Trace detection module 31 detects communications between processor 15 and seed cache 17 via a tap 43 along processor-cache bus 19.

In the present case, system AP1 is a development system for a set-top box. The peripherals include a television receiver for receiving television signals to be processed by the set-top box. The peripherals also include a flash-ROM for storing an application program with instructions for processing the television. Upon start up, the program is transferred to main memory 23, from where it is accessed by processor 15.

The purpose of cache-selection system AP1 is to develop an optimal design for the set-top box. The designs for processor 15, bus 21, main memory 23, and peripherals 25, are treated as givens. Seed cache 17 is treated as a viable selection for a cache for the ultimate system, but is not assumed to be optimal. Instead, system AP1 is designed to compare alternatives to seed cache 17.

Seed cache 17 is a four-way set associative cache with 32-bit word locations arranged in four-word lines and sixty-four line locations per set. The cache includes a write buffer that is one-word wide and four-words deep. The dimensions and other parameters of seed cache 17 are selected to be within the ranges to be represented by the cache design candidates to be evaluated for use in the production set-top box.

Processor 15 and seed cache 17 are closely coupled to promote a high communications rate therebetween. Trace detection module 31 is also closely coupled to processor and seed cache so that it can "keep up with" and not impair the cache communications rate. Accordingly, processor 15, seed cache 17, and trace capture module 31 are integrated circuits mounted on common prototype integrated circuit 41.

It should be noted that one second of trace data at 100 MHz can consume gigabytes of storage. Such a volume of data poses a considerable burden in terms of data transfer and storage. It is not feasible for all the required storage to be located close to detection module 31.

Accordingly, trace detection module 31 provides for trace compression. This reduces the amount of data to be transferred to storage, reducing bandwidth requirements on the data output from trace detection module 31 relative to the bandwidth at its input. This bandwidth reduction makes it feasible for the compressed trace data to be transmitted off prototype integrated circuit 41 for storage. Accordingly, trace capture module 33 includes memory modules located off prototype integrated circuit 41. The memory modules provide for 100 megabytes of storage for of compressed trace data; this memory is intended to hold about one second of trace data captured at 100 MHz.

Significant trace data compression is achievable using compression schemes such as that employed in Hewlett-Packards N-trace system for debugging software. Such a scheme employs not only conventional data compression techniques, but also take advantage of specific information about the application program. For example, it is not necessary to communicate every address asserted by the processor in full. Instead, a one-bit confirmation can be used to indicate that an address is the expected address given assumptions regarding addresses appearing in series and given the assumption that a call to an address will result in the called address appearing on processor-cache bus 19.

Since the trace data is compressed, it must be expanded before being used by cache evaluation program 39. The trace data can be expanded while the cache evaluation program is running. An alternative would be to expand the trace data and store it on disk for later use by the cache-evaluation program 39. However, it is faster to leave the trace data compressed and expand it on the fly as it is needed by cache evaluation program.

Cache evaluation program 39 can accept as inputs a number of alternative cache designs. It can then run the trace data against the designs to provide a performance measure for each design. Further an a lysis, without or without computer assistance can make decisions regarding cost-versus-performance issues.

Once the trace data is captured, the cache analysis is relatively cost and time efficient. It is not impractical to compare the performances of hundreds of cache designs. The designs can differ along parameters such as memory size, line length, the number of sets, the fineness of validity indications (e.g., whether validity is indicated on a per-line or a per-word basis), write buffer width and depth, replacement policy, write-hit policies, write-miss policies, etc. Since the trace data is captured in an environment that is essentially the same as the target application conditions, the trace data has the highest possible validity. Accordingly, the validity of the performance evaluations is higher than it would be given less valid trace data.

While system AP1 involves a hardware model, the invention provides as well for a software model that includes the same basic components as the hardware model. Instead of physical components, a software model can include a software processor module, a software seed cache module, and modules for the system bus, main memory and peripherals. The software model can include an interface for capturing and storing trace data. The simulation system does not face the same speed requirements as the hardware system; however, compression of trace data is still desirable for storage purposes. Thus, the expansion program and the trace analysis program can be the same as in the hardware embodiment.

Figure 2:
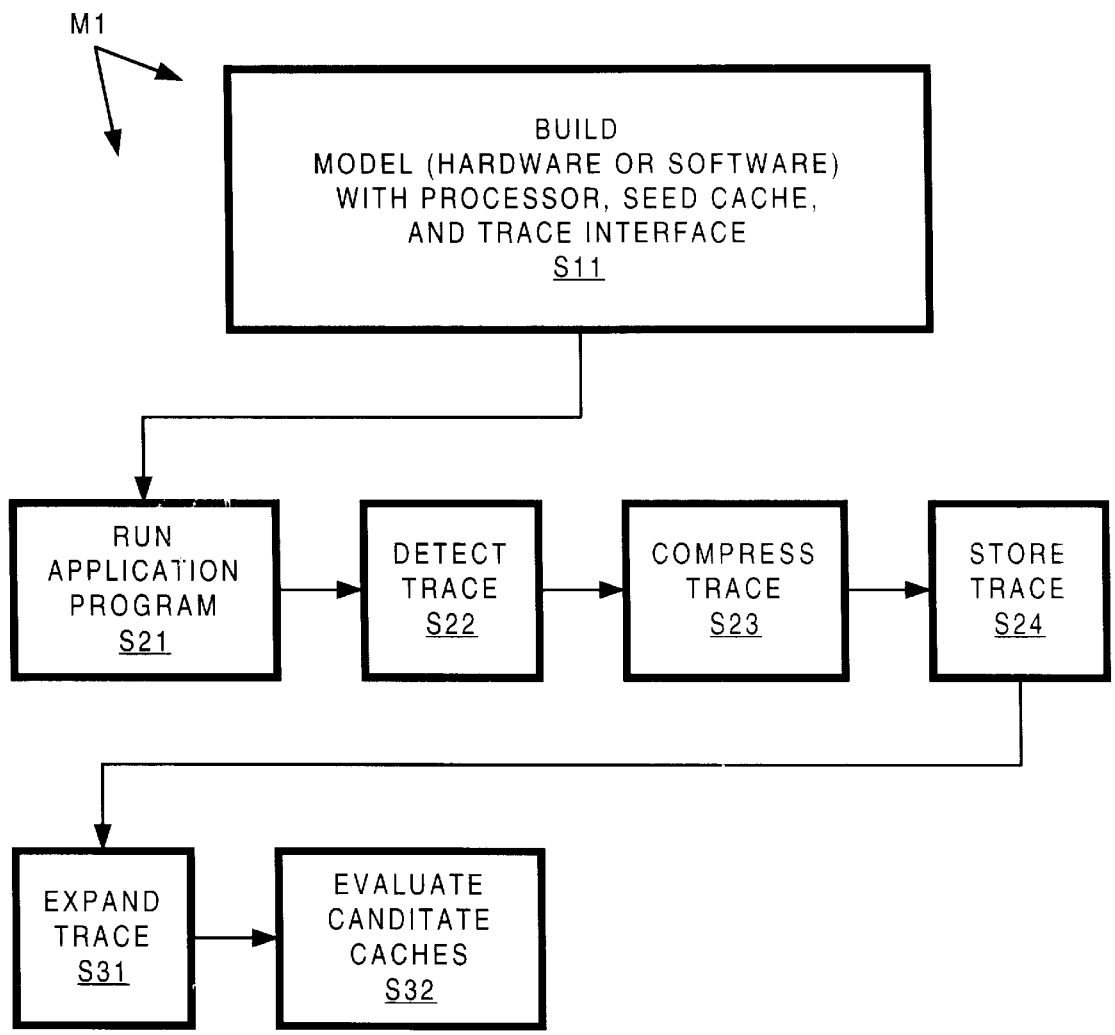
FIG. 2 is a flow chart of a method of the invention practiced in the system of FIG. 1.

A method M1 of the invention is flow charted in FIG. 2. Step S11 involves building a model, which can be a hardware or software model, that includes a seed cache and a trace-detection module. The trace-detection module preferable provides for trace data compression.

Step S21 involves running an application program. This can be the program or part of the application program intended to be run on the system to be developed. Alternatively, a test program other than the application can be run on the system. (Herein, "test" program refers to the program run to generate a trace, whether or not the program is the application program.) In a software embodiment of method M1, the application program is run in simulation. Step S22 involves detecting the communications between the processor and the cache, in other words, acquiring the trace. Preferably trace data is compressed at step S23. Finally, the trace data is stored at step S24. Note that steps S21–S24 are run concurrently in pipelined fashion.

If the trace data is stored in compressed form, it can be expanded at step S31 to provide a list of memory accesses in preparation for cache evaluation. Then, at step S32, the performance of various cache designs given the trace data is predicted so that the cache designs can be compared. The best performing cache can be selected for use in the system to be developed. Alternatively, a cost-versus-performance analysis can be conducted to determine the cache design to be selected. Note that steps S31 and S32 are run concurrently in a pipelined fashion. Step S32 can be iterated for each candidate cache design. Step S31 can be repeated for each iteration of step S32.

The hardware and software embodiments of method M1 each have their advantages. The hardware embodiments require integrated circuits to be fabricated before trace data can be acquired, whereas the software embodiment does not. On the other hand, it can be easier to obtain hardware samples of peripherals than to develop software models for the peripherals to be used in simulation. Thus, the selection of a hardware or software embodiment can depend in part on the difficulty of simulating certain peripherals.

Trace data can be compressed or not in either hardware embodiments or software embodiments. However, leaving the data uncompressed in a hardware embodiment might require running at a clock speed well below that intended for the final system. This large deviation in speed could impair the accuracy of the trace data for peripherals, such as television receivers, that are hard to model in software. In the software embodiments, compression is not required for full-speed operation—which is not in general possible. However, compression is still desirable for storage purposes.

Once the trace data is acquired, there is no difference between the software and hardware embodiments. Both allow many cache designs to be evaluated with margin costs per additional evaluation. The major issue is the accuracy of the trace data. In many applications, trace data acquired at full speed in a hardware embodiment will be the most accurate.

In the illustrated embodiment, the method is applied to a data/instruction cache with an integrated write buffer. The method can be applied to systems with a Harvard Architecture in which the parameters of separate data and instruction caches are considered in tandem. (Alternatively, the data and the instruction caches can be selected independently.) The method can be applied to systems without a write buffer and systems in which the write buffer is separate from the main cache. Likewise, the method can be applied to other cache-like elements such as translation-look-aside buffers that are typically included in memory management units. In general, the method can be applied to systems with more than one cache; in such cases, the caches can be evaluated individually or collectively.

The accuracy of the evaluations will be greatest where the cache designs to be evaluated are most similar to the seed cache. Careful selection of the seed cache can provide more accurate results. Accordingly, the invention provides for the use of multiple models. For example, a few very different cache designs might be used as seeds. Cache evaluation involves running the trace acquired from the most similar seed cache design. Also, the invention provides for iterative evaluations. A best performing cache can be determined by comparisons using a first trace. Then a second model using the best performing cache design as a seed cache can be used to develop a second trace. This second trace can be used to make more refined cache evaluations of designs close to the second seed cache design. These and other variations upon and modifications to the described embodiments are provided for by the present invention, the scope of which is defined by the following claims.

What is claimed is:

1. A method for selecting a cache design for a computer system including a processor and a cache, said method comprising the steps of:

building a system model of said computer system including a processor model of said processor and a seed cache model;

running a test program on said model;

capturing a trace of communications between said processor model and said seed cache model while said test program is running; and using a software program to evaluate the performance of said cache designs given said trace.

2. A method as recited in claim 1 wherein said system model is a hardware model.

3. A method as recited in claim 2 wherein said step of capturing a trace involves detecting said communications via a tap to signal paths between said processor model and said seed cache model.

4. A method as recited in claim 3 wherein said step of capturing a trace involves compressing information detected via said tap using a compression scheme based in part on knowledge of the contents of said test program.

5. A method as recited in claim 3 wherein said processor model runs at an intended clock speed for said processor.

6. A method as recited in claim 1 wherein said system model is a software model.

7. A system for selecting a cache design for a computer system including a processor and a cache, comprising:

means for building a system model of said computer system including a processor model of said processor and a seed cache model;

means for running a test program on said model;

means for capturing a trace of communications between said processor model and said seed cache model while said test program is running; and means for using a software program to evaluate the performance of said cache designs given said trace.

* * * * *